United States Patent
Papic et al.

(10) Patent No.: US 10,107,350 B2
(45) Date of Patent: Oct. 23, 2018

(54) FOLDING BELLOWS FOR USE WITH A VEHICLE SUBASSEMBLY

(71) Applicant: Ford Global Technologies, LLC, Dearborn, MI (US)

(72) Inventors: Ivica Papic, Nordrhein Westfalen (DE); Achim Lordick, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/349,707

(22) Filed: Nov. 11, 2016

(65) Prior Publication Data

US 2017/0234394 A1    Aug. 17, 2017

(30) Foreign Application Priority Data

Nov. 12, 2015    (DE) .................. 10 2015 222 348

(51) Int. Cl.
*F16F 9/38* (2006.01)
*F16J 3/04* (2006.01)

(52) U.S. Cl.
CPC .................... *F16F 9/38* (2013.01); *F16J 3/04* (2013.01); *F16F 2230/105* (2013.01)

(58) Field of Classification Search
CPC .... F16F 9/38; F16F 9/361; F16F 9/084; F16F 2230/105; F16J 3/04; F16J 3/045; F16J 3/047; F16J 3/041
See application file for complete search history.

(56) References Cited

U.S. PATENT DOCUMENTS

| 2,932,203 | A * | 4/1960 | Peters ............... F15B 21/00 251/335.3 |
| 3,442,096 | A * | 5/1969 | Orain ................ F16D 3/845 464/175 |
| 6,460,665 | B1 | 10/2002 | Gotz et al. | |
| 2004/0182437 | A1* | 9/2004 | Messick ........... E21B 43/123 137/155 |

(Continued)

FOREIGN PATENT DOCUMENTS

| DE | 703176 U | 2/1972 |
| EP | 0198734 A1 | 10/1986 |
| EP | 0327347 A2 | 8/1989 |

(Continued)

OTHER PUBLICATIONS

"Dacia Duster Febi Front Shock Absorbert Boot Gaiter Dust Cover", EBAY Listing, Nov. 7, 2014.

(Continued)

*Primary Examiner* — Nicholas J Lane
(74) *Attorney, Agent, or Firm* — Raymond L. Coppiellie; Burgess Law Office, PLLC

(57) ABSTRACT

A folding bellows for protecting an interior of the folding bellows effectively from environmental influences and managing pressure changes in the interior. The folding bellows having a gas-tight casing including a plurality of folds in an axial direction. Opposed front faces adjoining the casing. The front faces closed in a gas-tight manner. The casing having a wide region and a narrow region each formed of a plurality of folds with the outer cross-sectional surface of the folds in the wide region being larger than those in the narrow region. The folding bellows in one embodiment used with a motor vehicle subassembly.

16 Claims, 4 Drawing Sheets

(56) References Cited

U.S. PATENT DOCUMENTS

2014/0077430 A1\* 3/2014 Heo .......................... F16F 9/38
                                                                    267/292

FOREIGN PATENT DOCUMENTS

| EP | 0545765 A1 | 6/1993 |
|----|------------|--------|
| EP | 1905660 A1 | 4/2008 |
| EP | 1681185 A3 | 7/2009 |
| EP | 2276641 B1 | 6/2012 |
| FR | 2563885 A2 | 11/1985 |
| FR | 2578934 A1 | 3/2013 |
| WO | WO2012010757 A1 | 1/2012 |

OTHER PUBLICATIONS

"Renault Megane MK3 Coupe Febi Front Shock Absorber Gaiter", EBAY Listing, Nov. 7, 2014.

\* cited by examiner

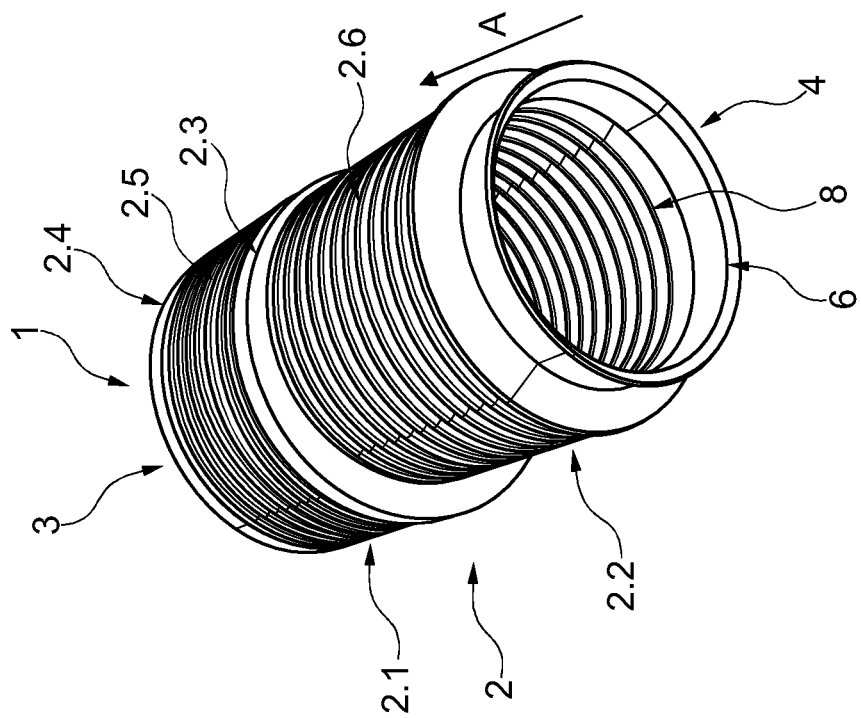
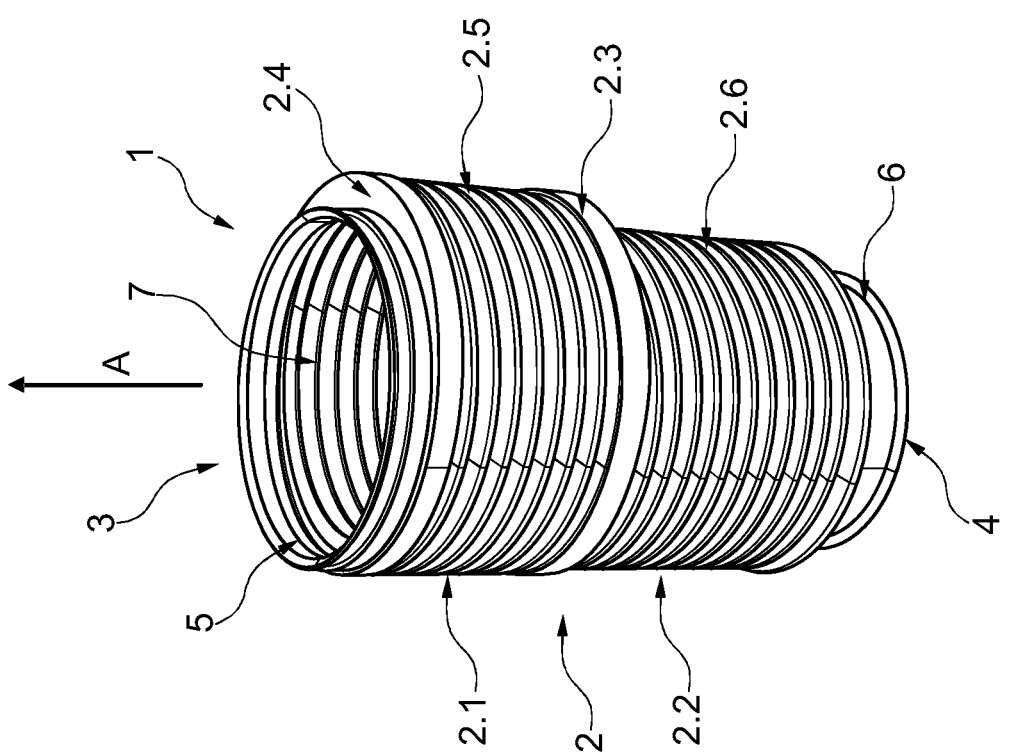
Fig. 1A
Fig. 1B

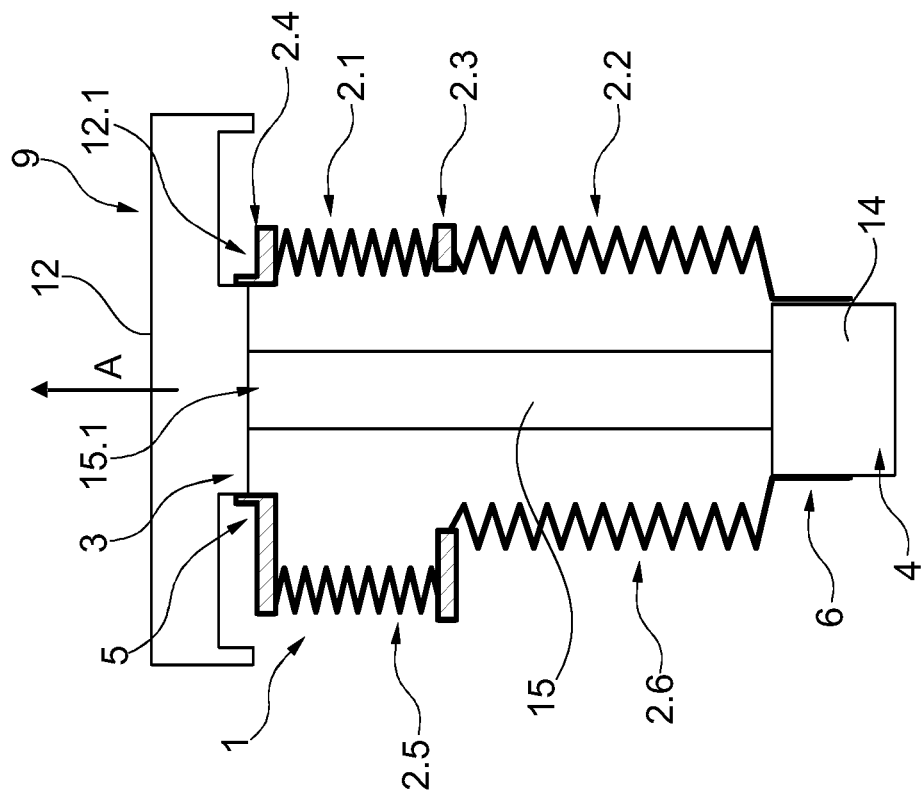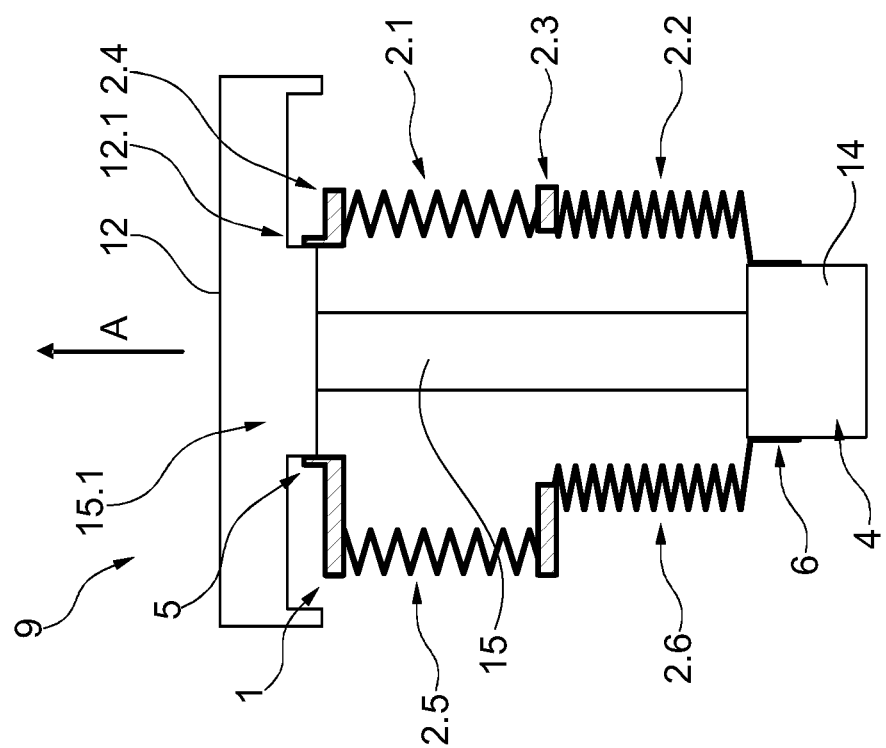

FOLDING BELLOWS FOR USE WITH A VEHICLE SUBASSEMBLY

CROSS-REFERENCE TO RELATED APPLICATIONS

Not Applicable.

BACKGROUND OF THE INVENTION

1. Field of the Invention

The present invention relates generally to the field of protective covers and, more particularly to the configuration of a folding bellows.

2. Description of Related Art

Folding bellows typically form a casing surrounding an interior including a plurality of folds formed in succession in a longitudinal direction. The folds folded in an accordion fashion and protecting an interior thereof from, for example, dirt or moisture. Folding bellows may be produced, for example, from a thermoplastic elastomer or even from rubber.

Amongst other things folding bellows are used to protect machine parts having a sliding relationship to one another, for example folding bellows may protect bearings in joints or even cables that kink. A folding bellows may be used with a piston-cylinder unit, for example a shock absorber of a motor vehicle, to protect the piston rod and the transition region between the piston rod and the cylinder body. With a shock absorber, the folding bellows surrounds at least the piston rod and is surrounded by a spiral spring arranged around the shock absorber.

Typically, altering the length of the bellows, extending the folds, increases the volume enclosed by the folding. However, an expansion transversely to the axial direction is only possible to a limited extent whereby the enclosed volume is substantially predetermined by the specific length the folding bellows is extended and/or compressed. In typical applications, however, the axial expansion of the folding bellows may vary considerably over time, for example by a factor of 2 or more. This results in alterations to the volume in the same order of magnitude. If the folding bellows is closed in a gas-tight manner and a gas located inside the folding bellows is compressed to a smaller volume, leading to a pressure increase that counters the free mobility of the folding bellows and potentially damaging the folding bellows. The same applies to a forced expansion of the gas to a larger volume, which leads to a negative pressure.

To compensate for pressure differences during contraction and expansion of the folding bellows, a gas exchange is provided between the interior of the folding bellows and either the surroundings or an attached compensation reservoir. If the gas exchange takes place with the surroundings, it is unavoidable that moisture and dirt particles enter the interior of the folding bellows and eventually impair or even prevent the function of the elements protected in the interior of the folding bellows. Seals, for example labyrinth seals, may slow contaminant entry. But these involve additional costs, in terms of manufacture and construction, and may not substantially eliminate the problem. In particular, they provide limited moisture protection.

Connecting the folding bellows to a compensation reservoir, which permits an alteration in volume, provides effective protection from dirt and moisture because combining the flexible bellows with the compensation reservoir forms a sealed system. However, the structural cost increases since additional space and fastening means for the compensation reservoir and optionally a connection line to the folding bellows are required.

SUMMARY OF THE INVENTION

A bellows including a gas-tight casing having a plurality of folds in succession in an axial direction and two axially opposing front faces adjoining the casing. The bellows having an external cross-sectional surface of the folds changing in the axial direction, wherein the casing includes at least one wide region and at least one narrow region wherein the outer cross-sectional surface of the folds in the wide region is larger than in the narrow region. A first reinforced region is formed between the narrow region and the wide region.

Further areas of applicability of the present invention will become apparent from the detailed description provided. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1A is a perspective view of a folding bellows according to the invention.

FIG. 1B is an additional perspective view of the folding bellows of FIG. 1A.

FIG. 3A is a highly schematic sectional view of part of the spring damper unit and folding bellows of FIG. 2 in a first position.

FIG. 3B is a highly schematic sectional view of part of the spring damper unit and folding bellows of FIG. 2 in a second position.

DETAILED DESCRIPTION OF THE PREFERRED EMBODIMENTS

Figure 2:
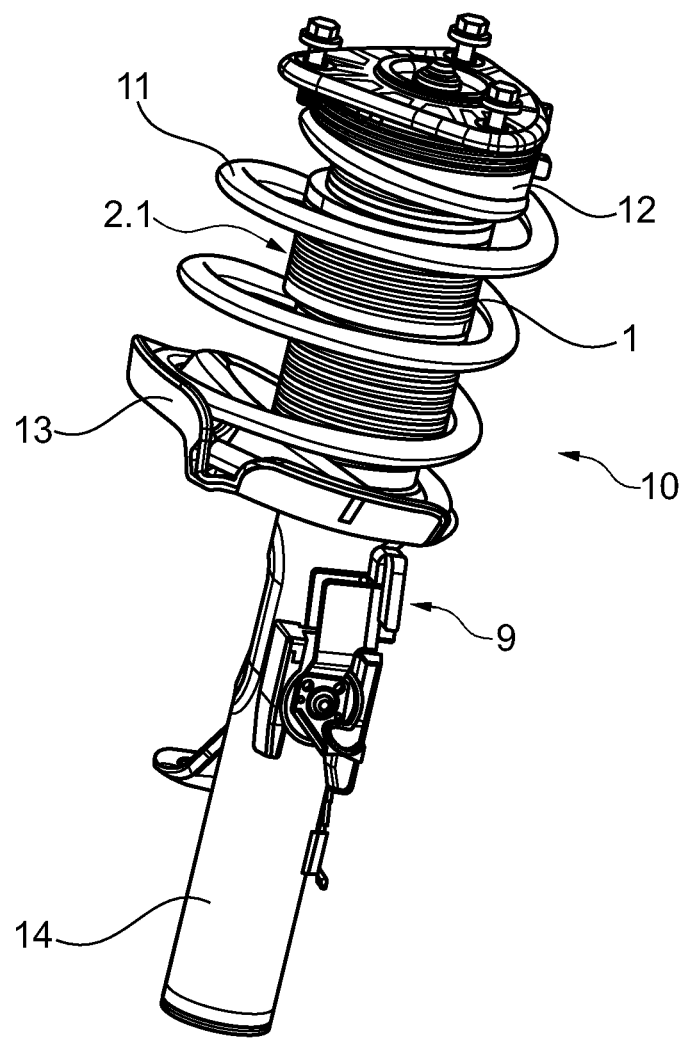
FIG. 2 is a perspective view of a spring damper unit with the folding bellows of FIGS. 1A and 1B.

The following description of the preferred embodiment(s) is merely exemplary in nature and is in no way intended to limit the invention, its application, or uses.

In the various figures, the same parts are always provided with the same reference numerals, which is why generally these parts are only described once.

FIGS. 1A and 1B show a folding bellows 1 for use with a subassembly 9, 10. In the disclosed example, the folding bellows 1 are made from rubber or an elastomer and extend in an axial direction A. The folding bellows form a cylindrical-shaped casing 2 extending tangentially to the axial direction A. The casing having a plurality of folds 2.5, 2.6 formed from relatively thin-walled material and having sufficient flexibility permitting alteration or change of the axial length of the folding bellows 1. The folding bellows 1 have an approximately cylindrical overall shape or structure. A first front face 3 includes a first connecting collar 5 surrounding a first opening 7 of the casing 2. A second connecting collar 6 surrounds a second opening 8 on an opposing second front face 4 of the casing 2. Access to the interior of the folding bellows 1 is possible through the openings 7, 8.

The casing 2 includes a narrow region 2.2 formed adjacent the second front face 4. The narrow region 2.2 offset from a wide region 2.1 by a first reinforced region 2.3. The wide region 2.1 including a series of first folds 2.5, each of the first folds 2.5 having a circular cross section. The narrow region 2.2 including a series of second folds 2.6, each of the second folds 2.6 having a circular cross-section. As shown, the second folds 2.6 have a smaller radius and a smaller outer cross-sectional surface than the first folds 2.5.

The first folds 2.5 have the same radius. The same applies to the second folds 2.6. Moreover, the entire wide region 2.1 is offset transversely to the axial direction A relative to the narrow region 2.2. This could also be an eccentric arrangement. So the narrow region 2.2, the connecting collars 5, 6 and the openings 7, 8 may be aligned relative to a common axis of symmetry. The first reinforced region 2.3 and a second reinforced region 2.4 adjacent to the first front face 3 terminate the wide region 2.1 on both sides and support said region. The reinforced regions 2.3, 2.4 are configured as thickened portions of the casing 2 and are substantially inflexible in contrast to the folds 2.5, 2.6. The function of the reinforced regions 2.3, 2.4 is to avoid undesired deformations of the folding bellows 1 and, due to the eccentric arrangement of the wide region 2.1, to improve the absorption of any non-symmetrical forces that occur.

FIG. 2 shows the folding bellows 1 of FIGS. 1A and 1B installed in a spring damper unit 10 of a motor vehicle. As shown, the spring damper unit 10 includes a cylinder 14 of a shock absorber, with the folding bellows 1, forming a shock absorber subassembly 9. The folding bellows 1 fastened by the second front face 4 to the cylinder 14 and fastened by the first front face 3 to a spring plate 12.

As shown in FIG. 2, the spring damper unit 10 includes a lower spring plate 13 fastened to the cylinder 14. The lower spring plate 13 supports one side of a helical spring 11 and an upper spring plate 12, connected to the piston rod 15, supports the other side of the helical spring. The direction of the path of the helical spring 11 need not coincide with the axis of the cylinder 14; the helical spring 11 may be of non-cylindrical construction. A variable amount of constructional space is present around the folding bellows 1 depending on the direction. A centered arrangement of the wide region 2.1 increases the risk that the folding bellows 1 collides with the helical spring 11. The eccentric arrangement, arranges the folding bellows 1 at a suitable orientation, wherein the folding bellows 1 are easily integrated inside the spring damper unit 10 despite the relatively large diameter of the wide region 2.1.

FIGS. 3A and 3B illustrate in a highly schematic manner the mode of operation of the folding bellows 1 inside the shock absorber subassembly 9. The first connecting collar 5 connected, in a gas-tight manner, to a closure element 12.1 configured on the upper spring plate 12. The closure element 12.1 rigidly connected to an end 15.1 of the piston rod 15 remote from the cylinder. The closure element 12.1 and first connecting collar 5 forming a gas-tight closure at the first front face 3. The second connecting collar 6 connected in a gas-tight manner to the cylinder 14 and forming a gas-tight closure at the second front face 4. Pipe clips, not shown, may secure the connecting collars 5, 6. Other known mechanisms may fasten the connecting collars 5, 6 in a gas-tight manner.

Since the casing 2 is gas-tight, a gas exchange between the inside of the folding bellows 1 and its surroundings is not possible. The quantity of gas in the interior of the folding bellows 1 is always constant. Compression and extension of the spring damper unit 10 alters or changes the length of the folding bellows 1 and leads to compression and/or expansion of the enclosed gas. FIG. 3A shows a state in which the folding bellows 1 is compressed in the axial direction A. The pressure increase associated therewith leads to the first folds 2.5 being axially expanded compared to the second folds 2.6. Since the total axial length is predetermined, a greater volume is available to the enclosed gas. The increased internal pressure, acting on the different surface portions inside the folding bellows 1, results in a force that expands the wide portion 2.1 thereof relative to the narrow portion 2.2. The forces produced are distributed asymmetrically due to the asymmetrical configuration of the wide region 2.1 and absorbed by the reinforced regions 2.3, 2.4.

FIG. 3B shows a state in which the folding bellows is expanded in the axial direction A. Since the enclosed gas volume increases while the quantity of gas remains the same, a negative pressure is produced. This leads to the wide region 2.1 contracting relative to the narrow region 2.2 and/or the narrow region 2.2 expanding relative to the wide region 2.1. Because a smaller volume is available to the gas, the negative pressure is limited and/or reduced. Contraction and/or expansion of the regions results from the individual forces produced by the negative pressure on the surface elements of the folding bellows 1. The forces are again distributed asymmetrically and able to be absorbed by the reinforced regions 2.3, 2.4.

The gas-tight closure of the interior of the folding bellows 1 reduces contamination of the cylinder 14 or the piston rod 15 due to moisture or dirt particles. The folding bellows 1, automatically adapts in volume to negative and/or excess pressure, and limits the compressive load. This improves the functionality of the shock absorber subassembly since high levels of excess pressure and/or negative pressure could lead to undesirable restoring forces. The service life of the folding bellows 1 is increased by limiting the compressive load.

Figure 4:
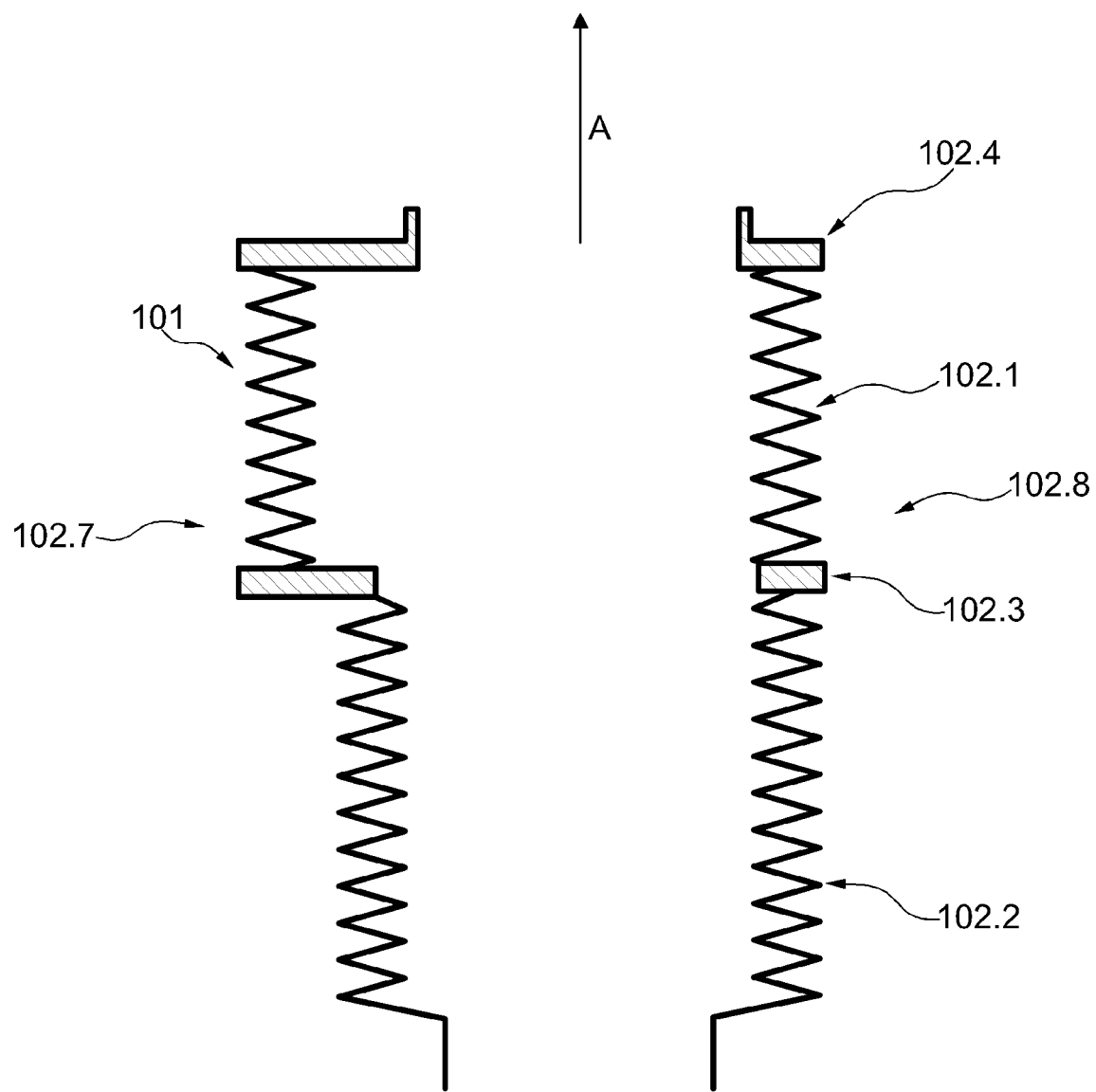
FIG. 4 is a highly schematic sectional view of a folding bellows according to an alternative embodiment of the invention.

FIG. 4 shows a highly schematic sectional view of a folding bellows 101 according to an alternative embodiment. The alternative embodiment similar to that shown in FIGS. 1-3B and not all details are described again. The folding bellows 101 has a casing 102 with a wide region 102.1 and a narrow region 102.2. The wide region 102.1 offset laterally relative to the narrow region 102.2 and surrounded by reinforced regions 102.3, 102.4. Both the wide region 102.1 and the narrow region 102.2 have a greater material thickness on a first casing side 102.7 than on an opposing second casing side 102.8 and/or a second casing side, tangentially offset by 180°, to prevent an undesirable asymmetrical deformation of the folding bellows 101. The first casing side 102.7 is the side toward which the wide region 102.1 is offset relative to the narrow region 102.2. By this reinforcement, the first casing side 102.7 is reinforced relative to the second casing side 102.8 and can withstand, in a more effective manner, the forces occurring there.

In one example, the folding bellows 1 is incorporated in a shock absorber subassembly 9 of the spring damper unit 10 for use with a motor vehicle. The motor vehicles are passenger motor vehicles or heavy goods vehicles. The subassembly 9 includes the folding bellows 1 having a gas-tight casing 2 having a plurality of folds in succession in an axial direction. The axial direction typically the direction of extension of the folding bellows 1 and often (but not necessarily) is the direction along which the folding bellows has the greatest expansion. The casing 2 has a certain flexibility and may be formed from, at least partially, an elastomer or rubber. In principle, other materials are also possible. Further, a plurality of materials may be used, for example, a composite structure. The folding bellows 1 having two axially opposing front faces 3, 4 adjoining the casing 2. Connecting structures or collars 5, 6 formed on the front faces 3, 4 assist in fastening the folding bellows 1 to a further element. The connecting structures 5, 6 are preferably integrally formed with the casing 2. Optionally, the casing 2 may itself have connecting structures 5 6. Normally, the folding bellows 1 has on each front face 3, 4 an opening 7, 8. In the assembled state, for example, a component penetrating or engaging the folding bellows 1 is guided therethrough. The folding bellows 1 preferably configured in one piece. Preferably, the folds extend as a whole in the axial direction over at least 50%, optionally also over at least 70% of the length of the folding bellows.

The folding structure of the casing 2 permits an axial expansion (length increase) and contraction (length reduction). In the operating state, the axial length of the folding bellows 1 may be enlarged or reduced. Expansion and contraction normally take place alternately. In the operating state, the folding bellows 1 fastened, for example, in the region of the front faces 3, 4 to adjacent components, so the respective front face follows a movement of the adjacent component. The components may form part of the shock absorber subassembly 9.

The front faces 3, 4 are closed in a gas-tight manner. The folding bellows 1 normally has openings 7, 8 on each front face 3, 4 for elements belonging to the subassembly and connecting collars 5, 6 for forming a gas-tight closure. Since the casing is also gas-tight, therefore, an interior of the folding bellows and a gas located therein (for example air) is sealed. The interior of the folding bellows 1 is protected from moisture and particles coming from the surroundings. It forms to a certain extent a sealed system. Components arranged inside the folding bellows 1 are also protected from dirt and other environmental influences. Because the folding bellows 1 is gas-tight, the folding bellows 1 cannot discharge gas to the surroundings or to a compensation reservoir and/or receive gas therefrom to produce a pressure compensation when changing or altering the length thereof.

To provide for pressure compensation, the folding bellows 1, according to one example of the present invention includes an external cross-sectional surface of the folds that alters in the axial direction to compensate for an alteration to the length associated with an excessive pressure alteration that could hinder the movement of the folding bellows or even damage the bellows. "External cross-sectional surface" means the cross-sectional surface transversely to the axial direction in the region in which the respective fold has its largest radial expansion (transversely to the axial direction). If the folds have a wave-like or zig-zag-like structure, the part furthest to the outside of the folds is considered. The outer cross-sectional surface is the surface enclosed by the outer edge of the fold (i.e. including the interior of the folding bellows). For example, the entire circular surface is meant as a circular cross section. The qualifier "outer" is omitted sometimes for brevity. As illustrated the casing 2 has folds in the axial direction, the cross-sectional surfaces thereof differing. Folds with a larger cross-sectional surface and folds with smaller cross-sectional surface may also be present.

The different outer cross-sectional surfaces enable a local alteration to the length of the casing that is, by necessity, associated with different volume alterations, depending on the region in which the local alteration to the length of the folds takes place. In a fold that has a larger cross-sectional surface, a local alteration to the length means a larger alteration to the volume than in a fold that has a smaller cross-sectional surface. This means that with a specific axial expansion of the folding bellows different volumes may be adopted. For example, folds with a larger cross-sectional surface may be compressed (i.e. compressed in the axial direction) while folds with a smaller cross-sectional surface are expanded. With the same length, a smaller volume results than if the folds with a larger cross-sectional surface were expanded and those with a smaller cross-sectional surface were compressed. The high pressure produced, for example, with axial compression of the folding bellows, expands the folds with a larger cross-sectional surface, whereby the volume increases and an excess pressure is limited. In reverse, with the negative pressure produced, for example, with axial expansion of the folding bellows, the folds with a smaller cross-sectional surface expand (wherein the folds with larger cross-sectional surface are compressed), whereby the volume decreases and a negative pressure is limited. The system follows the external force (pressure alteration), in which it reacts with a volume alteration. By changing the cross-sectional surface, it is possible to limit and/or to restrict pressure alterations of the folding bellows, without gas exchange between a compensation reservoir or the surroundings. The folding bellows of the disclosed example protecting the interior of the folding bellows without a connection to a compensation reservoir.

As shown, the casing 2 includes at least one wide region 2.1 and at least one narrow region 2.2 with each region having a plurality of folds 2.5, 2.6, wherein the outer cross-sectional surface of the folds 2.5, 2.6 in the wide region 2.1 is larger than in the narrow region 2.2. Here, therefore, at least two connecting regions of a plurality of folds are always present, wherein the cross-sectional surfaces of all folds in the wide region are larger than the cross-sectional surfaces of the folds in the narrow region. This expressly includes the possibility of different cross-sectional surfaces being present inside the regions. It is also conceivable that more than one narrow region and/or more than one wide region are present.

In one example, the outer cross-sectional surface of the folds alters or changes from the narrow region to the wide region. In the transition from the narrow region to the wide region from one fold to the next, a marked enlargement of the cross-sectional surface takes place, illustrated in a side view of the folding bellows as a step-like structure.

In a further example, the outer cross-sectional surface of the folds alters in a stepwise manner from the narrow region to the wide region. An alteration takes place in several intermediate steps, wherein the individual steps may be of the same size or of a different size. In a side view of the folding bellows, therefore, there is no step but, for example, a type of obliqueness. The assignment of the folds arranged in the transition region to the narrow region or to the wide region is generally not distinct.

In principle, it is possible that inside a narrow region or wide region different cross-sectional surfaces are present. However, the outer cross-sectional surface of the folds inside the narrow region and/or inside the wide region is constant. For example, the folds have the same cross-sectional surface inside the respective region. This embodiment will implement the advantages according to the invention. Optionally, it is possible to achieve approximately the same loading on the folds inside the respective region, which may have a positive effect on the service life of the folding bellows. However, when the cross-sectional surfaces inside such a region vary slightly, for example by a maximum of 5%, this has no substantial effect on the function and service life of the folding bellows.

The folds may be arranged symmetrically relative to a common axis of symmetry that extends in the axial direction. However, deviations therefrom are also conceivable. According to a further example, the wide region is arranged offset relative to the narrow region transversely to the axial direction. The wide region arranged eccentrically relative to the narrow region and/or vice versa depending on the point of view. The folds in the narrow region may be symmetrical relative to a first axis of symmetry while the folds in the wide region are symmetrical relative to a second axis of symmetry offset from the first axis of symmetry. It is possible, for example, that in the installed state the wide region is displaced to one side, in which sufficient constructional space is present, and its radial expansion on an opposing side where the constructional space is limited, does not differ, or only differs slightly from that of the narrow region. If the folding bellows is part of a spring damper unit, for example, where it surrounds the shock absorber, structures including the spring may not be arranged parallel and/or concentric to the shock absorber. It may be advantageous if the wide region is displaced to one side, to avoid a collision with the spring surrounding the folding bellows. According to a preferred embodiment, openings and/or connecting structures formed on the front faces are symmetrical to the same axis of symmetry as the narrow portion.

In particular, but not exclusively, in an offset arrangement of the wide region it is preferred that a first reinforced region 2.3 is formed between the narrow region 2.2 and the wide region 2.1. This region 2.3 is reinforced in comparison with the adjacent wide 2.1 and narrow 2.2 regions, which, for example, may be achieved by providing a greater material thickness. Such an embodiment is advantageous when the cross-sectional surface alters or changes from the wide 2.1 to the narrow 2.2 region, since otherwise the forces in the transition region could lead to a deformation of the folding bellows 1 that is difficult to estimate. This applies when the wide region 2.1 is arranged offset to the side so an asymmetrical action of force has to be considered.

A second reinforced region 2.4 may be configured at one end of the wide region 2.1 remote from the narrow 2.2 region. The second reinforced region 2.4 may be used independently or in combination with the first reinforced region 2.3. The second reinforced region 2.4 may, for example, be used when the wide region 2.1 adjoins a front face where a connecting structure (for example a collar, flange or the like) adjoins with a markedly smaller cross-sectional surface. When there is a sudden transition from a larger cross-sectional surface to a smaller cross-sectional surface, it may be expedient to provide a corresponding reinforcement. This also applies when the wide region is arranged offset to the side of the connecting structure and/or the narrow region.

Alternatively or additionally to the aforementioned reinforced region, the casing may have a greater material thickness on a first casing side than on an opposing second casing side. The first and second casing sides are located radially opposite one another and/or offset tangentially by 180° to one another. Here, the wide region or the narrow region, in particular both regions, may have a greater material thickness on one side. In this example, the first casing side is reinforced relative to the second casing side that, with an asymmetrical distribution of force, also counteracts an undesirable asymmetrical deformation of the folding bellows. In particular, the first casing side may be that side toward which the wide region is offset relative to the narrow region.

The cross section of the casing and/or the individual folds may be shaped in any manner within the scope of the invention, for example ellipsoidal or polygonal. In particular, different folds may also have differently shaped cross sections. The casing may have a partially circular cross section with the folds of the corresponding portion having a circular cross-sectional surface. In particular, the at least one narrow portion and/or the at least one wide portion (and/or the folds inside the aforementioned portions) have a circular cross section. Particularly, the narrow and wide portions have a circular cross section. This also applies to those embodiments where the wide portion is laterally offset from the narrow portion.

While shown used with a shock absorber assembly 9 of a spring damper unit 10 the folding bellows 1 may be used in different fields, in particular all fields in which folding bellows are also conventionally used. As shown, the folding bellows 1 surrounds a piston rod of a shock absorber and at least indirectly a front face is connected to a cylinder of the shock absorber and the other front face is connected to an end of the piston rod remote from the cylinder. The connections may be provided directly or by interposed elements. A closure element may be configured on the cylindrical end integrally with the piston rod, which, for example, in cooperation with a sill closes an opening of the folding bellows on the front face in a gas-tight manner. A corresponding closure element may be formed on the cylinder. In the known manner, the shock absorber subassembly may be part of a spring damper unit, wherein a helical spring surrounds the shock absorber with the folding bellows.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A bellows comprising:
a gas-tight casing having a plurality of folds in succession in an axial direction and two axially opposing front faces adjoining the casing;
an external cross-sectional surface of the folds changing in the axial direction wherein the casing includes at least one wide region and at least one narrow region wherein the outer cross-sectional surface of the folds in the wide region is larger than in the narrow region;
the folds in the narrow region symmetrical to a first axis of symmetry and the folds in the wide region symmetrical to a second axis of symmetry wherein the first axis of symmetry is spaced from the second axis of symmetry; and
a first reinforced region formed between the narrow region and the wide region.

2. The bellows of claim 1 including a second reinforced region configured at one end of the wide region remote from the narrow region.

3. The bellows of claim 1 wherein the outer cross-sectional surface of the folds changes abruptly from the narrow region to the wide region.

4. The bellows of claim 1 wherein the outer cross-sectional surface of the folds changes in a stepwise manner from the narrow region to the wide region.

5. The bellows of claim 1 wherein an outermost diameter of each fold within the narrow region is the same as an outermost diameter of each of the other folds within the narrow region or an outermost diameter of each fold within the wide region is the same as an outermost diameter of each of the other folds within the wide region.

6. The bellows of claim 1 wherein the first axis of symmetry is parallel to the second axis of symmetry.

7. A bellows comprising:
a gas-tight casing having a plurality of folds in succession in an axial direction and two axially opposing front faces adjoining the casing;
an external cross-sectional surface of the folds changing in the axial direction wherein the casing includes at least one wide region and at least one narrow region wherein the outer cross-sectional surface of the folds in the wide region is larger than in the narrow region;
a first reinforced region formed between the narrow region and the wide region;
a second reinforced region configured at one end of the wide region remote from the narrow region; and
said wide region having a longitudinal axis and said narrow region having a longitudinal axis wherein longitudinal axis of said wide region is offset relative to the longitudinal axis of said narrow region transversely to the axial direction.

8. The bellows of claim 7 wherein the outer cross-sectional surface of the folds changes abruptly from the narrow region to the wide region.

9. The bellows of claim 7 wherein the outer cross-sectional surface of the folds changes in a stepwise manner from the narrow region to the wide region.

10. The bellows of claim 7 wherein an outermost diameter of each fold within the narrow region is the same as an outermost diameter of each of the other folds within the narrow region or an outermost diameter of each fold within the wide region is the same as an outermost diameter of each of the other folds within the wide region.

11. A subassembly for a motor vehicle comprising;
a shock absorber including a piston rod and a cylinder;
a folding bellows having a gas-tight casing having a plurality of folds in succession in an axial direction and two axially opposing front faces adjoining the casing;
an external cross-sectional surface of the folds changing in the axial direction wherein the casing includes at least one wide region and at least one narrow region wherein the outer cross-sectional surface of the folds in the wide region is larger than in the narrow region;
said wide region having a longitudinal axis and said narrow region having a longitudinal axis wherein longitudinal axis of said wide region is offset relative to the longitudinal axis of said narrow region transversely to the axial direction;
a first reinforced region formed between the narrow region and the wide region; and
a second reinforced region configured at one end of the wide region remote from the narrow region wherein the folding bellows surrounds said piston rod and at least indirectly a face of said folding bellows is connected to said cylinder and an opposing face of the folding bellows is connected to an end of the piston rod spaced from the cylinder.

12. The subassembly of claim 11 wherein the outer cross-sectional surface of the folds changes abruptly from the narrow region to the wide region.

13. The subassembly of claim 11 wherein an outermost diameter of each fold within the narrow region is the same as an outermost diameter of each of the other folds within the narrow region or an outermost diameter of each fold within the wide region is the same as an outermost diameter of each of the other folds within the wide region.

14. The subassembly of claim 11 wherein the outer cross-sectional surface of the folds inside the narrow region or inside the wide region is constant.

15. The subassembly of claim 11 wherein the wide region is arranged offset relative to the narrow region transversely to the axial direction.

16. The subassembly of claim 11 wherein the casing has at least partially a circular cross-section.

* * * * *